US011940806B2

(12) United States Patent
Yu et al.

(10) Patent No.: US 11,940,806 B2
(45) Date of Patent: Mar. 26, 2024

(54) LINE LASER MODULE AND AUTONOMOUS MOBILE DEVICE

(71) Applicant: Beijing Roborock Technology Co., Ltd., Beijing (CN)

(72) Inventors: Guang Yu, Beijing (CN); Mingchuan Wang, Beijing (CN); Yongji Long, Beijing (CN)

(73) Assignee: Beijing Roborock Technology Co., Ltd., Beijing (CN)

( * ) Notice: Subject to any disclaimer, the term of this patent is extended or adjusted under 35 U.S.C. 154(b) by 1 day.

(21) Appl. No.: 17/680,370

(22) Filed: Feb. 25, 2022

(65) Prior Publication Data

US 2022/0283592 A1 Sep. 8, 2022

(30) Foreign Application Priority Data

Mar. 8, 2021 (CN) .......................... 202110251303.0

(51) Int. Cl.
*G05D 1/02* (2020.01)
*G05D 1/00* (2006.01)

(52) U.S. Cl.
CPC ......... *G05D 1/0248* (2013.01); *G05D 1/0242* (2013.01); *G05D 2201/0203* (2013.01)

(58) Field of Classification Search
None
See application file for complete search history.

(56) References Cited

U.S. PATENT DOCUMENTS

| 4,697,880 | A | * | 10/1987 | Angerstein | ............... G02B 7/02 359/823 |
| 2015/0168954 | A1 | * | 6/2015 | Hickerson | ............ G05D 1/0248 901/1 |
| 2018/0344115 | A1 | | 12/2018 | Shin et al. | |

(Continued)

FOREIGN PATENT DOCUMENTS

| CN | 105615778 A | 6/2016 |
| CN | 106443697 A | 2/2017 |

(Continued)

OTHER PUBLICATIONS

Wu, "Structured light module and autonomous mobile equipment", 2020, Machine translation of CN110960138 (Year: 2020).*

(Continued)

*Primary Examiner* — Hongye Liang
(74) *Attorney, Agent, or Firm* — Thomas Horstemeyer, LLP

(57) ABSTRACT

Embodiments of the present disclosure provide a line laser module and an autonomous mobile device. The line laser module includes a fixed base, and a camera and a line laser emitter arranged on the fixed base. The line laser emitter is provided at one or more sides of the camera, and configured to emit a laser with a linear projection. The camera is configured to operate in conjunction with the line laser emitter, and to capture an environmental image. An infrared filter is arranged in front of the camera, and configured to allow only infrared light to enter the camera. The autonomous mobile device includes an infrared flashlight. The camera is configured to capture, at different time points, a first environmental image for distance measurement and a second environmental image for object identification.

19 Claims, 8 Drawing Sheets

(56) References Cited

U.S. PATENT DOCUMENTS

2020/0077859 A1\* 3/2020 Nien .................. B60L 53/37
2021/0164785 A1\* 6/2021 Dooley ................ G05D 1/0221

FOREIGN PATENT DOCUMENTS

| CN | 107517374 A | 12/2017 |
|----|-------------|---------|
| CN | 208913404 \* | 5/2019 |
| CN | 208913404 U | 5/2019 |
| CN | 110960138 \* | 4/2020 |
| CN | 110960138 A | 4/2020 |
| CN | 110974083 A | 4/2020 |
| CN | 111083332 A | 4/2020 |
| CN | 111093019 A | 5/2020 |
| CN | 112864778 A | 5/2021 |
| CN | 112909712 A | 6/2021 |
| CN | 113031607 A | 6/2021 |

OTHER PUBLICATIONS

Sun, "Monocular vision assembly system", 2019, Machine translation of CN208913404 (Year: 2019).\*

PCT, International Search Report for PCT/CN2021/113641, dated Nov. 16, 2021.

\* cited by examiner

LINE LASER MODULE AND AUTONOMOUS MOBILE DEVICE

CROSS REFERENCE TO RELATED APPLICATION

The present application claims the priority of the Chinese Patent Application No. 202110251303.0, field on Mar. 8, 2021, the entire content of which is incorporated herein by reference.

FIELD

The present disclosure relates to the field of cleaning equipment, and in particular to a line laser module and an autonomous mobile device.

BACKGROUND

With the development of technology, a variety of robots with intelligent systems have emerged, such as sweeping robots, mopping robots, vacuum cleaners, weed whackers, etc. These robots can automatically travel and perform cleaning or removal operations in a certain area without user operation. The robots usually perform obstacle avoidance by means of distance measurement. Currently, laser emitters and cameras are usually used to work in conjunction with each other to perform the distance measurement.

SUMMARY

According to some embodiments of an aspect, the present disclosure provides a line laser module, which includes a fixed base, and a camera and a line laser emitter arranged on the fixed base. The line laser emitter is provided at one or more sides of the camera, and configured to emit a laser with a linear projection. The camera is configured to operate in conjunction with the line laser emitter, and capture an environmental image. The line laser emitter is movably connected the fixed base, thereby causing an orientation angle and a rotation angle of the line laser emitter to be adjustable.

In some embodiments, the fixed base includes a body, end portions and a connection element, wherein the end portions are located on respective sides of the body. The camera is arranged on the body, and the line laser emitter is inserted into the connection element. The line laser emitter is rotatably connected to the connection element to adjust the rotation angle of the line laser emitter. The connection element is movably connected the end portions to adjust the orientation angle of the line laser emitter.

In some embodiments, each of the end portions is provided with a positioning groove, and the connection element is provided with a convex portion, which is adapted to mate with the positioning groove and configured to be horizontally rotatable within the positioning groove, thereby driving the line laser emitter to be rotatable relative to the end portion.

In some embodiments, the fixed base is provided with a mounting cavity including a first end and a second end. A cross-sectional area of the first end is smaller than a cross-sectional area of the second end. The line laser emitter is movably arranged in the mounting cavity. The cross-sectional area of the first end is larger than a cross-sectional area of the line laser emitter. A front end of the line laser emitter is close to the first end. The line laser emitter is rotatable relative to the mounting cavity to adjust the rotation angle of the line laser emitter. A rear end of the line laser emitter is configured to swing relative to the front end to adjust the orientation angle of the line laser emitter.

In some embodiments, the line laser emitter is in a cylindrical shape, and provided with a first stepped structure at a peripheral side of the line laser emitter. The fixed base is provided with a mounting groove for mounting the line laser emitter, and the mounting groove is provided with a second stepped structure on an inner wall of the mounting groove. The first stepped structure and the second stepped structure are adapted to mate with each other to limit movement of the line laser emitter in an axial direction.

In some embodiments, the line laser module further includes a return positioning device configured to receive an infrared signal emitted by a charging station.

In some embodiments, the return positioning device further includes an infrared emitting device configured to emit an infrared signal.

According to some embodiments of an aspect, the present disclosure provides a line laser module applied in an autonomous mobile device, which includes a fixed base, and a camera and a line laser emitter arranged on the fixed base. The line laser emitter is provided at one or more sides of the camera, and configured to emit a laser with a linear projection. The camera is configured to operate in conjunction with the line laser emitter, and to capture an environmental image. A filter is arranged in front of the camera, and configured to allow only infrared light to enter the camera. The camera is configured to capture, at different time points, a first environmental image for distance measurement and a second environmental image for object identification.

In some embodiments, the line laser module further includes a return positioning device configured to receive an infrared signal emitted by a charging station.

In some embodiments, the return positioning device further includes an infrared emitting device configured to emit an infrared signal.

In some embodiments, the line laser emitter is movably connected the fixed base, and/or the fixed base includes a movable element, thereby causing an orientation angle and a rotation angle of the line laser emitter to be adjustable.

According to some embodiments of an aspect, the present disclosure provides an autonomous mobile device, which includes a device body, a controller, and an infrared flashlight. The controller is connected to the infrared flashlight, and configured to control the infrared flashlight to turn on or off. The autonomous mobile device further includes a line laser module arranged on the device body, which includes a camera and a line laser emitter. The controller is electrically connected to the camera and the line laser emitter, and configured to control the autonomous mobile device based on an environmental image captured by the camera.

In some embodiments, the camera is configured to capture a first environmental image when the line laser emitter is on, such that a distance between a target object and the camera is determined based on the first environmental image. The camera is further configured to capture a second environmental image when the infrared flashlight is on, such that the target object is identified based on the second environmental image.

In some embodiments, the camera is configured to capture a third environmental image when the line laser emitter and the infrared flashlight are both off, such that a corrected laser image is obtained based on differences between pixels at respective positions in the first environmental image and the third environmental image, and a distance between the target object and the camera is determined based on the corrected laser image.

In some embodiments, the first environmental image is captured by the camera under a preset first exposure parameter, and the second environmental image is captured by the camera under a second exposure parameter. The second exposure parameter is determined based on an imaging quality and a corresponding exposure parameter of a previously-captured second environmental image. Each of the first exposure parameter, second exposure parameter, and the corresponding exposure parameter comprises exposure time and/or exposure gain.

In some embodiments, a filter is arranged in front of the camera, and configured to allow only infrared light to enter the camera.

In some embodiments, the line laser module further includes a return positioning device configured to receive an infrared signal emitted by a charging station.

In some embodiments, the return positioning device includes an infrared emitting device configured to emit an infrared light.

In some embodiments, the autonomous mobile device further includes a bumper arranged at a front side of the device body.

In some embodiments, the infrared flashlight is arranged on the bumper.

BRIEF DESCRIPTION OF THE DRAWINGS

The following drawings are used herein as part of the embodiments of the present disclosure for the purpose of understanding the present disclosure. Embodiments of the present disclosure and descriptions thereof are shown in the drawings for explaining the principle of the present disclosure.

DESCRIPTION OF REFERENCE NUMERALS IN THE DRAWINGS

Figure 1:
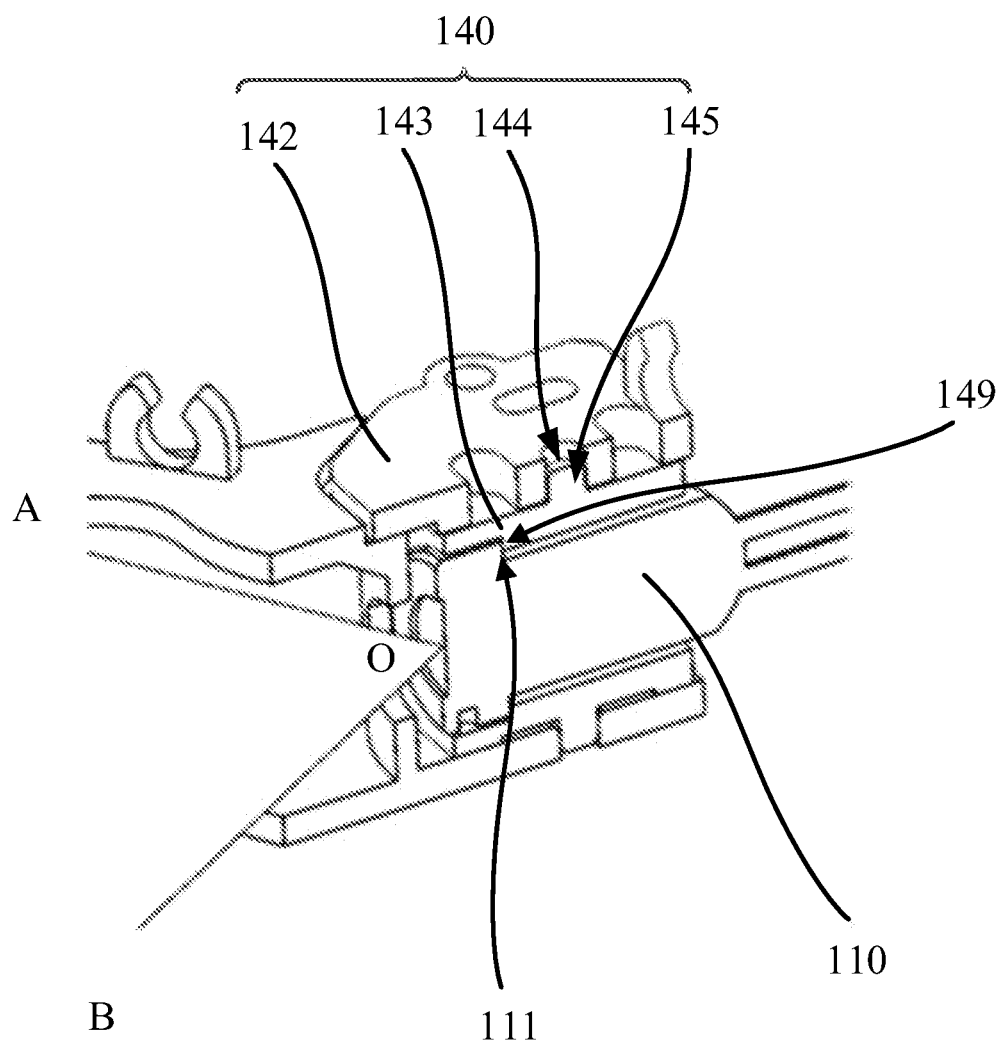
FIG. 1 is a structural schematic diagram illustrating a portion of a line laser module in some embodiments according to the present disclosure.

110: line laser emitter; 111: first stepped structure; 120: camera; 140: fixed base; 141: body; 142: end portion; 143: connection element; 144: positioning groove; 145: convex portion; 146: connection part; 147: limiting part; 148: limiting hole; 149: second stepped structure; 150: infrared emitting device; 160: infrared receiving device; 170: bumper; 171: window; 180: flashlight; 190: return positioning device; 200: device body.

DETAILED DESCRIPTION OF THE EMBODIMENTS

In the following description, a large number of details are provided in order to understand embodiments of the present disclosure more thoroughly. Obviously, for those skilled in the art, these embodiments can be implemented without one or more of these details.

It should be noted that the terms used herein are intended to describe the embodiments only, and are not intended to limit the embodiments according to the present disclosure. As used herein, the singular form is also intended to include the plural form, unless the context clearly indicates otherwise. Furthermore, it should also be understood that when the terms "contain" and/or "include" are used in the present description, they indicate the presence of the feature, integral, step, operation, component, and/or assembly that follows the term, but do not exclude the presence or addition of one or more other features, integral, steps, operations, components, assemblies and/or combinations thereof.

Exemplary embodiments according to the present disclosure will now be described in more detail with reference to the accompanying drawings. However, these exemplary embodiments may be implemented in a variety of different forms and should not be construed as being limited to the embodiments set forth herein. It should be understood that these embodiments are provided in order to make the present disclosure thorough and complete and to adequately communicate the ideas of these exemplary embodiments to those of ordinary skill in the art.

Embodiments of the present disclosure provide a line laser module, and further embodiments of the present disclosure provide an autonomous mobile device. Here, the line laser module is applied to the autonomous mobile device, and the autonomous mobile device is specifically an intelligent cleaning device, such as a sweeping robot, a mopping robot, a floor polishing robot, or a weeding robot. For ease of description, a sweeping robot is used in embodiments as an example to describe the technical solution of the present disclosure.

In some embodiments, the autonomous mobile device may include a device body 200, a sensing system, a control system, a drive system, a cleaning system, an energy system, and a human-machine interactive system, etc. These systems coordinate with each other to enable the cleaning device to move autonomously and perform the cleaning function. The functional elements and the like constituting each of the above systems in the cleaning device are integrally provided within the device body 200.

The device body 200 is in a shape that is substantially circular (e.g., front and back are circular) and may be in other shapes, including, but not limited to, a substantially D shape with a square front and a round rear. The sensing system includes a line laser module provided above or to the side of the device body 200. A controller of the control system is connected to the line laser module and controls the function of the autonomous mobile device based on the sensing result of the line laser module.

In some embodiments, there is no limitation on the specific position of the line laser module relative to the device body 200. For example, it may be, but is not limited to, the front side, the back side, the left side, the right side, the top, the middle, and the bottom of the device body 200, among others. Further, the line laser module can be provided at a central position, a top position, or a bottom position in the height direction of the device body 200.

In some embodiments, the autonomous mobile device moves forward to perform an operational task. In order to better detect environmental information ahead, the line laser module is provided on the front side of the device body 200. The front side is the side towards which the device body 200 faces during the forward movement of the autonomous mobile device.

Figure 2:
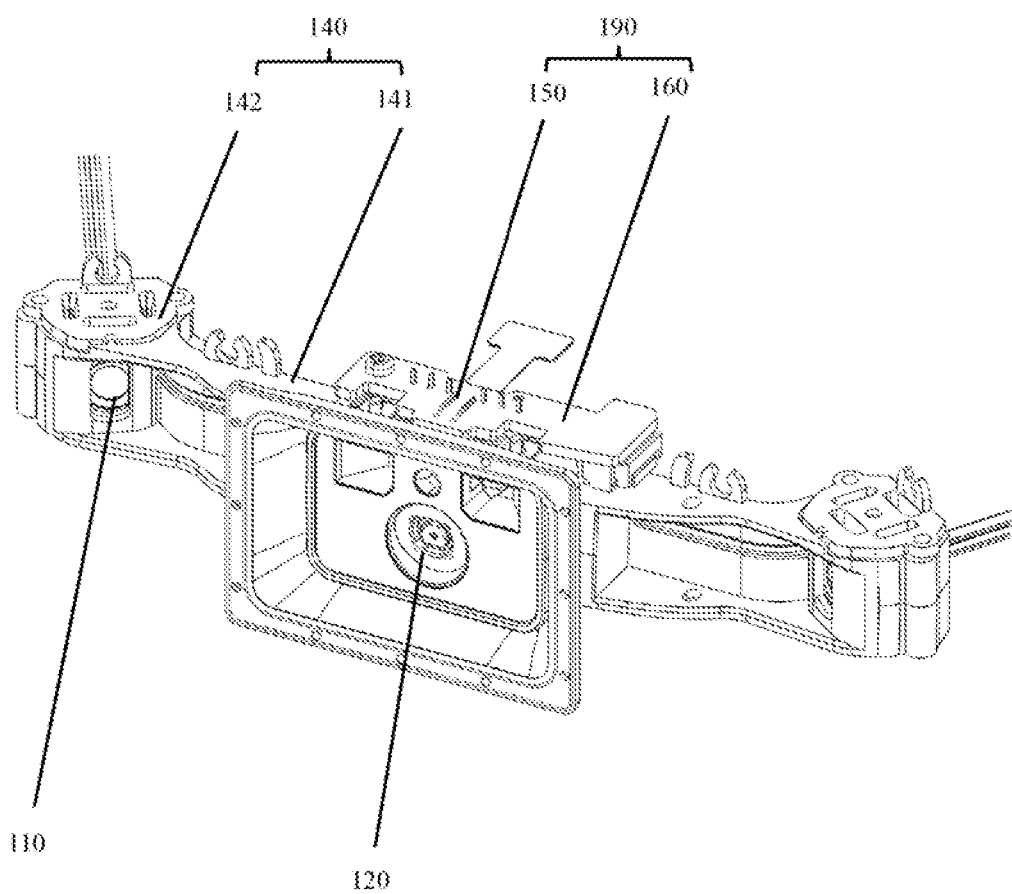
FIG. 2 is a structural schematic diagram illustrating a line laser module in some embodiments according to the present disclosure.

As shown in FIGS. 1 and 2, the line laser module includes a fixed base 140, and a camera 120 and a line laser emitter 110 arranged on the fixed base 140. The line laser emitter 110 is provided at one or more sides of the camera 120 and emits a laser with a linear projection. The camera 120 works in conjunction with the line laser emitter 110 and captures an environmental image. The line laser emitter 110 is movably connected the fixed base 140, and/or the fixed base 140 includes a movable element, so that the orientation angle and the rotation angle of the line laser emitter 110 are adjustable.

The line laser module provided in embodiments according to the present disclosure is capable of identifying an obstacle or terrain in front of the device body 200 for a corresponding obstacle avoidance operation or a sweeping operation by means of the camera 120 and the line laser emitter 110 cooperating with each other. The line laser emitter 110 is movably connected the fixed base 140, and/or the fixed base 140 includes a movable element, so that the orientation angle and the rotation angle of the line laser emitter 110 are adjustable by adjusting the position of the line laser emitter 110 relative to the fixed base 140, and/or by adjusting the relative position between various elements of the fixed base 140 itself. Thus, when assembling the line laser emitter 110 onto the fixed base 140, it is convenient to adjust the irradiation angle and the irradiation range of the line laser emitted by the line laser emitter 110, so as to quickly and easily realize the calibration of the line laser emitter 110 itself and the calibration in conjunction with the camera 120, which is simple and convenient to operate and is conducive to improving the assembly efficiency.

Further, by reasonably adjusting the orientation angle of the line laser emitter 110, the line laser can be emitted within the field of view of the camera 120, so as to ensure that the camera 120 can accurately and comprehensively capture the light emitted by the line laser emitter 110 and reflected by the obstacle. Thereby, the accuracy and comprehensiveness of the environmental images acquired by the camera 120 is improved. It should be understood that by adjusting the orientation angle of the line laser emitter 110 on each side of the camera 120, the line laser on each side is later fixed by adhesive dispensing. By reasonably adjusting the rotation angle of the line laser emitter 110, the line laser is perpendicular to the horizontal plane, which is conducive to increasing the measurement range.

In one embodiment, on one hand, the line laser emitter 110 is movably connected the fixed base 140, so that the orientation angle and the rotation angle of the line laser emitter 110 are adjustable by adjusting the position of the line laser emitter 110 relative to the fixed base 140. On the other hand, the fixed base 140 includes a movable element, so that the orientation angle and the rotation angle of the line laser emitter 110 are adjustable by adjusting the relative positions between the elements of the fixed base 140 itself. On yet another hand, the line laser emitter 110 is movably connected the fixed base 140, and the fixed base 140 includes a movable element, so that the orientation angle and the rotation angle of the line laser emitter 110 are adjustable by adjusting the position of the line laser emitter 110 relative to the fixed base 140 and by adjusting the relative positions between the elements of the fixed base 140 itself. Embodiments of the present disclosure provide different ways to adjust the orientation angle and the rotation angle of the line laser emitter 110, so as to meet the requirements of the fixed base 140 with different designs and different connections between the line laser emitter 110 and the fixed base 140.

Further, the line laser emitter 110 is configured to emit a laser with a linear projection. For example, the line laser emitter 110 emits a laser plane outside, and the laser plane will form a line laser on the surface of the obstacle when it reaches the obstacle. Thus, the environmental image can be detected by the line laser. In this case, the plane AOB shown in FIG. 1 characterizes the plane of the line laser emitter 110 perpendicular to the line laser, the plane ABF and the plane CDE shown in FIG. 4 characterize the laser planes of the line laser emitter 110, and the line segment AB and the line segment CD in FIG. 4 characterize the line lasers. In an embodiment, the line laser emitter 110 may be a laser tube. It should be understood that the line laser emitter 110 may also be other structures that meet the requirements, without specific limitation of the present disclosure. It should be understood that a wave mirror may also be provided in the emission direction (e.g., in front) of the line laser emitter 110. Specifically, the wave mirror is a concave lens. E.g., a concave lens is provided in front of the laser tube. The laser tube emits light with a specific wavelength (e.g., infrared light), which, after passing through the concave lens, becomes a diverging light, thus forming a straight line in the plane perpendicular to the optical path.

Figure 4:
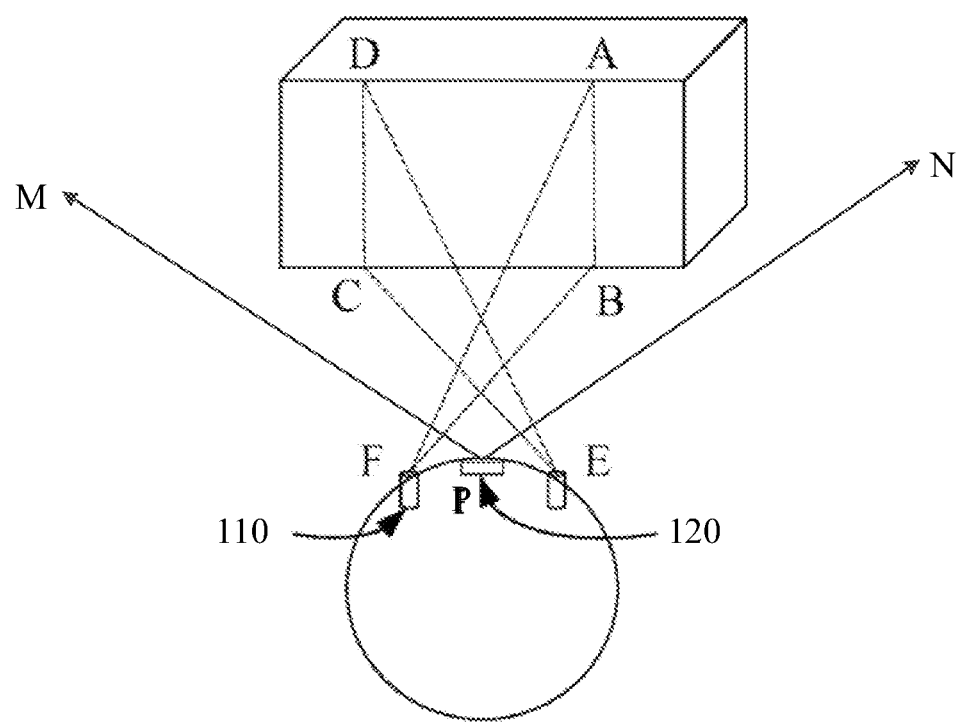
FIG. 4 is a schematic diagram illustrating the operating principle of a line laser emitter in some embodiments according to the present disclosure.
Figure 5:
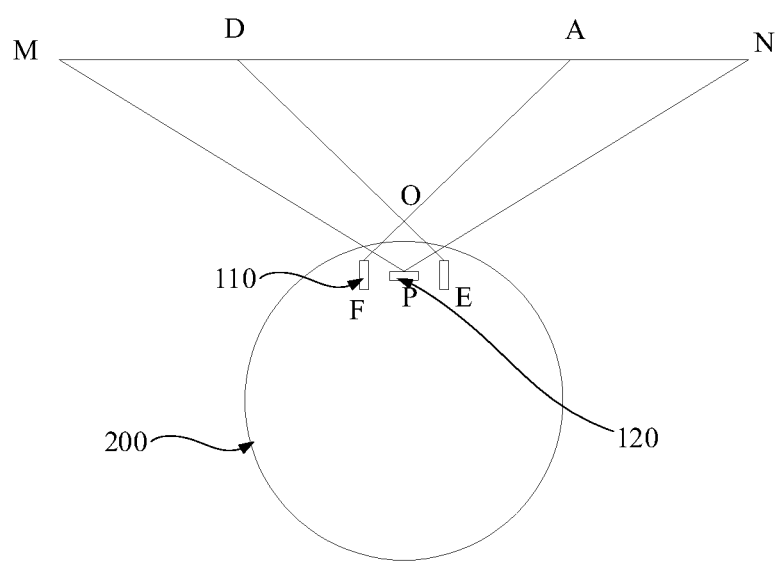
FIG. 5 is a schematic diagram illustrating relationships between a camera and the field of view of a line laser emitter in some embodiments according to the present disclosure.

As shown in FIGS. 4 and 5, the line laser emitters 110 are distributed on respective sides of the camera 120. The camera 120 and the line laser emitters 110 work in cooperation with each other. I.e., the first environmental image captured by the camera 120 is the line laser emitted by the line laser emitters 110 and reflected by the obstacle. The distance between the obstacle and the device body 200, or the distance between the obstacle and the line laser module can be measured based on the first environmental image, and then the corresponding obstacle avoidance operation can be performed.

In some embodiments, the rotation angle and the orientation angle of the line laser emitter 110 are adjusted by reasonably adjusting the mounting position and the mounting angle of the line laser emitter 110 relative to the fixed base 140, and/or by adjusting the relative positions between the elements of the fixed base 140 itself. Adjusting the rotation angle of the line laser emitter 110 allows the line laser to be perpendicular to the horizontal plane, i.e., to achieve self-calibration of the line laser emitter 110. Adjusting the orientation angle of the line laser emitter 110 allows the angle between the line laser and the optical axis of the camera 120 to be adjustable, so that the line laser is located within the field of view of the camera 120, i.e., to achieve the coordinated calibration between the line laser emitter 110 and the camera 120. Then, the orientation angle of the line laser emitter 110 located on each side of the camera 120 is reasonably adjusted, so as to determine the intersection point, within the field of view of the camera 120, of the line lasers emitted by the line laser emitters 110 on respective sides. Thus, the line lasers on respective sides can be adhesive dispensed, helping to realize the distance measurement of the obstacle in front of the device body 200.

In some embodiments, FIG. 4 is a schematic diagram illustrating the operating principle of a line laser module, where the letter "P" denotes the camera 120, the letters "E"

and "F" denote the line laser emitters 110 located on both sides of the camera 120 respectively, and the lines PM and PN denote the two boundaries of the horizontal field of view of the camera 120, i.e., ∠MPN denotes the horizontal field of view angle of the camera 120. The line laser emitters 110 emit the laser plane FAB and the laser plane ECD toward outside, and the laser plane will form a line laser on the surface of the obstacle when it reaches the obstacle, i.e., the line segment AB and the line segment CD shown in FIG. 4. Since the line laser (i.e., the line segment AB and the line segment CD) emitted by the line laser emitter is located within the field of view of the camera, the line laser can help to detect information such as outline, height and/or width of the object within the field of view of the camera. Thus, the camera can capture the environmental image detected by the line laser.

Further, the controller can calculate the distance from the line laser module or the device body 200 where the line laser module is located to the obstacle ahead based on the first environmental image captured by the camera 120. Specifically, the distance between the line laser module or the device body 200 and the obstacle ahead can be calculated using triangulation. As shown in FIG. 5, FIG. 5 is a schematic diagram from one perspective of view of the embodiment shown in FIG. 4, where the letter "P" denotes the camera 120, the letters "E" and "F" denote the line laser emitters 110 located on both sides of the camera 120, the point A denotes the projection of the line segment AB in the horizontal plane, the point D denotes the projection of the line segment CD in the horizontal plane, ∠MPN denotes the horizontal field of view of the camera 120, and the point O denotes the intersection of the line lasers emitted by the line laser emitters 110 and the optical axis of the camera 120. Taking the line laser emitter F as an example, when both the line laser emitter 110 and the camera 120 are fixedly mounted to the fixed base 140, the focal length of the camera 120 is known, the emission angle of the line laser emitter F is known, i.e., the angle between the line FA and the optical axis PO is known, and the length of the line segment OP is known, the center vertical distance between the line laser emitter F and the camera 120 in the horizontal plane is known. The environmental image, reflected by the obstacle (i.e., point A) and captured by the camera 120, is defined as the point A'. Since the point A' will have a certain offset compared to the optical axis straight line PO of the camera 120, and this offset is known, according to the triangle similarity principle, when combined with the above known conditions, the distance between A and F can be measured. That is, it is possible to obtain the distance between the obstacle and the line laser emitter 110. It should be understood that it is also possible to determine the terrain ahead based on the deformation characteristics of the line segment captured by the camera 120 after reflection by the obstacle of the line laser, in order to determine specific functional operations, such as performing an obstacle avoidance operation or continuing the sweeping operation.

In some embodiments provided by the present disclosure, the number of cameras 120 is not specifically limited, such as one, two, and three or other number that meets the requirements. Specifically, the camera 120 can be a monocular camera, or a binocular camera. It should be understood that in some embodiments, the total number of line laser emitters 110 is also not specifically limited, e.g., it may be two or more than two. There is also no limit to the number of line laser emitters 110 provided at each side of the camera 120, e.g., it may be one, two or more. Furthermore, the number of line laser emitters 110 on each side of the camera 120 may be the same or may not be the same. It should be understood that when the number of line laser emitters 110 on either side of the camera 120 is in plural, the plurality of line laser emitters 110 can be uniformly distributed or non-uniformly distributed. The present disclosure is not specifically limited in this regard.

Furthermore, in some embodiments, the camera 120 is capable of both distance measurement of the obstacle in front of the device body 200 and, at the same time, identification in type of the obstacle. In some embodiments, the camera 120 performs, according to different time points, distance measurement of the obstacle and identification in type of the obstacle, respectively. For example, the controller first determines the type of the obstacle based on a portion of the environmental image captured by the camera 120, and determines whether the device body 200 needs to perform an obstacle avoidance operation based on the type of the obstacle. In case that the device body 200 needs to perform an obstacle avoidance operation, the controller determines the distance from the obstacle based on another portion of the environmental image captured by the camera 120, so as to perform a corresponding obstacle avoidance operation. In case that the device body 200 does not need to perform an obstacle avoidance operation, the sweeping operation is performed directly, thereby reducing the misoperation possibility of obstacle avoidance by the autonomous device.

In some embodiments provided by the present disclosure, as shown in FIG. 1, the line laser emitter 110 is in a movable connected with the fixed base 140, and the fixed base 140 includes a movable element. In some embodiments, the fixed base 140 includes a body 141, an end portion 142 and a connection element 143. The camera 120 is arranged on the body 141, and the line laser emitter 110 is connected to the end portion 142 via the connection element 143. In this case, the connection element 143 is provided with a through-hole, the line laser emitter 110 is inserted into the connection element 143 via the through-hole, and the line laser emitter 110 is rotatably connected to the connection element 143. That is, the line laser emitter 110 is able to rotate in the through-hole of the connection element 143. Thus, the rotation angle of the line laser emitter 110 is adjusted in such a way that the line laser is perpendicular to the horizontal plane, extending the measurement range. The connection element 143 is movably connected the end portion 142. For example, the connection element 143 is horizontally rotatable relative to the end portion 142. Furthermore, the connection element 143 is rotatable relative to the end portion 142 in a plane parallel to the horizontal. I.e. the rotation axis of the connection element 143 relative to the end portion 142 is a straight line in the vertical direction, such that the connection element 143 drives the line laser emitter 110 to rotate relative to the end portion 142, thereby adjusting the orientation angle of the line laser emitter 110 to allow the line laser emitted by the line laser emitter 110 to be located within the field of view of the camera 120.

It should be understood that since the line laser emitter 110 is rotatable relative to the connection element 143 and the connection element 143 is movable relative to the end portion 142, it is possible to achieve calibration of the rotation angle of the line laser emitter 110 by rotating the line laser emitter 110 to an appropriate position in the through-hole of the connection element 143, i.e., to achieve self-calibration of the line laser emitter 110. The calibration of the orientation angle of the line laser emitter 110 can be achieved by rotating the connection element 143 relatively to the end portion 142 to an appropriate position. I.e., the calibration of the line laser emitter 110 in conjunction with the camera 120 can be achieved, which is easy to operate and convenient to calibrate. It should be understood that after the calibration of the rotation angle and the orientation angle of the line laser emitter 110 is completed, the connection element 143, the end portion 142, and the line laser emitter 110 can be fixedly connected using a fixing device, such as fixing the end portion 142, the body 141, and the line laser emitter 110 with adhesive, glue, etc., which is simple to operate.

Further in some embodiments, the end portion 142 is provided with a positioning groove 144, and the connection element 143 is provided with a convex portion 145 adapted to mate with the positioning groove 144. The convex portion 145 rotates horizontally within the positioning groove 144, and specifically, the convex portion 145 is raised in a vertical direction, so that the connection element 143 rotates relatively to the end portion 142 in a plane parallel to the horizontal plane. I.e., the rotation axis of the connection element 143 relative to the body 141 is a straight line in a vertical direction. Accordingly, the convex portion 145 of the connection element 143 rotates horizontally in the positioning groove 144 of the end portion 142. This can drive the line laser emitter 110 to rotate horizontally relative to the end portion 142 with the convex portion 145 acting as the rotation axis. Then, the line laser emitted by the line laser emitter 110 is allowed to be located within the field of view of the camera 120, so as to realize the coordination calibration between the line laser emitter 110 and the camera 120 with a simple structure and easy operation. It should be understood that the positioning groove 144 can be a circular positioning groove, and the convex portion 145 can be a cylindrical convex structure. With the coordination between the circular positioning groove and the cylindrical convex structure, it is conducive to improving the flexibility and reliability in rotation of the connection element 143 relative to the body 141. It should be understood that the positioning groove 144 may also be other shaped groove structures that meet the requirements.

Figure 6:
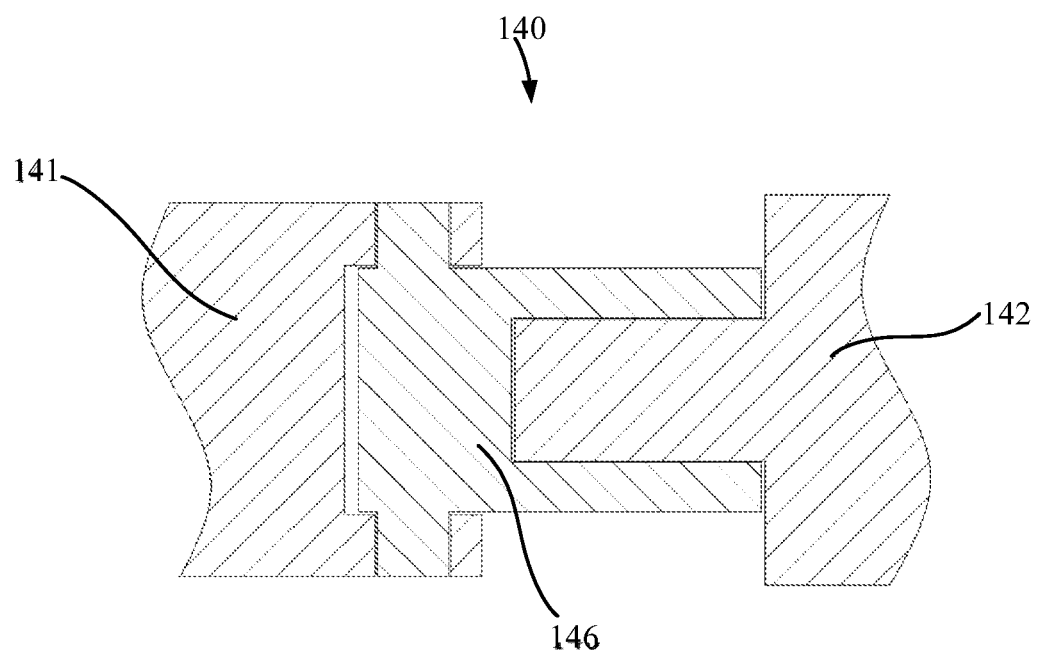
FIG. 6 is a structural schematic diagram illustrating a portion of a fixed base in some embodiments according to the present disclosure.

In some embodiments provided by the present disclosure, the fixed base 140 includes a movable element. As shown in FIG. 6, the fixed base 140 includes a body 141, end portions 142 and a connection part 146, wherein the end portions 142 are located on respective sides of the body 141. The camera 120 is arranged on the body 141, and the line laser emitter 110 is arranged on the end portions 142. For example, the line laser emitter 110 is fixedly or detachably mounted on the end portions 142. The connection part 146 is pivotally connected to the body 141, and the end portions 142 are connected to the connection part 146, so that the connection part 146 swings relative to the body 141 to adjust the orientation angle of the line laser emitter 110, causing the line laser emitted by the line laser emitter 110 to be located within the field of view of the camera 120. The end portions 142 are rotatably connected to the connection part 146. When the end portion s 142 rotate relative to the connection part 146, the rotation angle of the line laser emitter 110 can be adjusted, so that the line laser is perpendicular to the horizontal plane, thus extending the range of distance measurement.

In some embodiments, the connection part 146 is hinged to the body 141, the side of the connection part 146 facing the end portion 142 is provided with a cylindrical recess, and the end portion 142 is provided with a cylindrical protrusion that fits into the cylindrical recess. When the line laser emitter 110 is assembled onto the end portion 142, the cylindrical protrusion of the end portion 142 is placed in the cylindrical recess and rotates relative to the cylindrical recess, thereby adjusting the rotation angle of the line laser emitter 110. When the line laser is perpendicular to the horizontal plane, and then the end portion 142 is fixed to the connection part 146 such as with the use of glue or other limiting structures, self-calibration of the line laser emitter 110 can be achieved. After that, the orientation angle of the line laser emitter 110 can be adjusted by adjusting the swinging position of the connection part 146 relative to the body 141. When the line laser emitted by the line laser emitter 110 is located at the appropriate position within the field of view of the camera 120, the body 141 is fixed with the connection part 146, such as fixed with glue or other limiting structure, the coordinated calibration between the line laser emitter 110 and the camera 120 can be thus realized. It should be understood that since the fixed base 140 includes a movable element, i.e., the end portion 142 is movably connected the body 141 through the connection part 146, the calibration of the rotation angle and the orientation angle of the line laser emitter 110 mounted on the end portion 142 can be realized by reasonably adjusting the relative positions between the end portion 142, the connection part 146, and the body 141 during the calibration process. This is easy to operate and the calibration is convenient. It is should be understood that after the calibration of the rotation angle and the orientation angle of the line laser emitter 110 is completed, the end portion 142, the connection part 146, and the body 141 can be fixedly connected using a fixing device, such as a bonding agent, glue, and a limiting part 147, etc., which is easy to operate.

Figure 7:
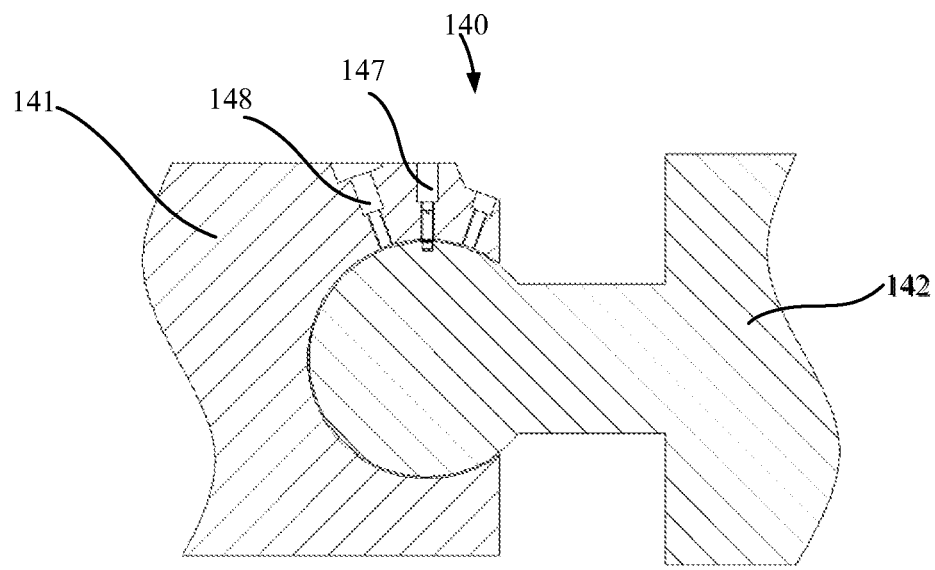
FIG. 7 is another structural schematic diagram illustrating a portion of a fixed base in some embodiments according to the present disclosure.

In some embodiments provided by the present disclosure, the fixed base 140 includes a movable element. In this case, the fixed base 140 includes the body 141, the end portions 142 and the limiting part 147. The end portions 142 are located on respective sides of the body 141. The camera 120 is arranged on the body 141, and the line laser emitter 110 is arranged on the end portions 142. As shown in FIG. 7, the end portion 142 is rotatably connected to the body 141. For example, the end portion 142 is in a ball-and-socket connection with the body 141, so that the end portion 142 can swing and rotate relative to the body 141. The line laser emitter 110 is assembled on the end portion 142. In this case, the orientation angle and the rotation angle of the line laser emitter 110 can be adjusted by swinging and rotating the end portion 142 relative to the body 141, which is easy to operate and convenient to calibrate.

In some embodiments, the end portion 142 is in a ball-and-socket connection with the body 141, the body 141 is provided with a limiting hole 148, and the limiting part 147 is a tight bolt. The rotation angle of the line laser emitter 110 is adjusted by the rotation of the end portion 142 relative to the body 141, and the self-calibration of the line laser emitter 110 is achieved when the line laser is perpendicular to the horizontal plane. The orientation angle of the line laser emitter 110 is adjusted by adjusting the swinging position of the end portion 142 relative to the body 141, and the coordinated calibration between the line laser emitter 110 and the camera 120 can be achieved when the line laser emitted by the line laser emitter 110 is located at an appropriate position within the field of view of the camera 120. Then, the position of the end portion 142 relative to the body 141 is limited and fixed using the tight bolt through the limiting hole 148, thereby achieving a simple operation of fixing the end portion 142 and the body 141. It can be understood that the number of limiting holes 148 on the body 141 can be one, two or more. According to different positions of the limiting holes 148, different numbers of limiting holes 148 are provided, so that when the end portion 142 is rotated to different positions relative to the body 141, the tight bolts can be made to fix the end portion 142 and the body 141 through the limiting holes 148. In this case, the tight bolt may also be a resilient member. I.e., the end of the tight bolt against the end portion 142 is a resilient member. Thus, the end portion 142 and the body 141 are reliably connected due to the resilience. It should be understood that the spherical surface of the end 142 can also be provided with a positioning hole adapted to mate with the tight bolt, so that the tight bolt is pressed through the limiting hole 148, fitted with the positioning hole 148, and then tighten, which is conducive to improving the reliability of the fixed connection between the end portion 142 and the body 141.

In some embodiments provided by the present disclosure, the line laser emitter 110 is movably connected the fixed base 140, and the fixed base includes a movable element. As shown in FIG. 2, the fixed base 140 includes a body 141 and end portions 142 located on respective sides of the body 141. The camera 120 is arranged on the body 141, and the line laser emitter 110 is arranged on the end portions 142. In some embodiment, the end portions 142 are pivotally connected to the body 141. For example, the end portions 142 are hinged to the body 141, such that the end portions 142 can swing relative to the body 141. The line laser emitter 110 is rotatably connected to end portions 142. For example, the line laser emitter 110 is cylindrical in shape, and is able to rotate relative to the mounting groove in the end portion 142. Thus, the rotation angle of the line laser emitter 110 can be adjusted to make the line laser perpendicular to the horizontal plane and extend the range of distance measurement. Since the line laser emitter 110 is mounted to the end portion 142, and the end portion 142 is able to swing relative to the body 141, the orientation angle of the line laser emitter 110 can be adjusted, so that the line laser emitted by the line laser emitter 110 is located within the field of view of the camera 120.

It should be understood that since the line laser emitter 110 is rotatable with respect to the end portion 142, and the end portion 142 is pivotally connected to the body 141, the calibration of the rotation angle of the line laser emitter 110 can be realized by rotating the line laser emitter 110 to an appropriate position during the calibration process. That is, the self-calibration of the line laser emitter 110 can be realized. By swinging the end portion 142 to an appropriate position with respect to the body 141, the calibration of the orientation angle of the line laser emitter 110 can be realized. That is, the calibration of the line laser emitter 110 in cooperation with the camera 120 can be achieved, which is simple to operate and convenient to calibrate. It should be understood that when the calibration of the rotation angle and the orientation angle of the line laser emitter 110 is completed, the end portion 142, the body 141, and the line laser emitter 110 can be fixedly connected using a fixing device, such as using a bonding agent, glue, etc., so as to achieve the simple operation of fixing the end 142, the body 141, and the line laser emitter 110.

In some embodiments provided by the present invention, the line laser emitter 110 is movably connected the fixed base 140. For example, the fixed base 140 is provided with a mounting cavity for mounting the line laser emitter 110, and the line laser emitter 110 is movably provided within the mounting cavity. The mounting cavity includes a first end and a second end, and the cross-sectional area of the first end is smaller than the cross-sectional area of the second end. That is, the mounting cavity is a flared structure, and the cross-sectional area of the first end is larger than the cross-sectional area of the line laser emitter 110, meaning that the line laser emitter 110 is able to move within the mounting cavity. In this case, the front end of the line laser emitter 110 is near the first end of the mounting cavity. By rotating the line laser emitter 110 relative to the mounting cavity, the rotation angle of the line laser emitter 110 can be adjusted, so that the line laser is perpendicular to the horizontal plane and the ranging range is expanded. By swinging the rear end of the line laser emitter 110 relative to the front end, the orientation angle of the line laser emitter 110 can be adjusted, so that the line laser emitted by the line laser emitter 110 is located within the field of view of the camera 120.

It should be understood that, since the line laser emitter 110 is movably provided in the mounting cavity of the fixed base 140, the line laser emitter 110 can both rotate and swing with respect to the body 141, so that the rotation angle and the orientation angle of the line laser emitter 110 can be achieved by reasonably adjusting the mounting angle and the mounting position between the line laser emitter 110 and the fixed base 140 during the calibration process, which is easy to operate and convenient to calibrate. It should be understood that after the calibration of the rotation angle and the orientation angle of the line laser emitter 110 is completed, the line laser emitter 110 can be fixedly connected to the fixed base 140 using a fixing device. For example, adhesive, glue, etc. can be used to fix the line laser emitter 110 on the fixed base 140. Then, the assembly of the line laser emitter 110 onto the fixed base 140 is completed, which is easy to operate.

In some embodiments provided by the present disclosure, the line laser emitter 110 is in a cylindrical shape and provided with a first stepped structure 111 at a peripheral side of the line laser emitter 110. The fixed base 140 is provided with a mounting groove for mounting the line laser emitter 110, and the mounting groove is provided with a second stepped structure on an inner wall of the mounting groove. The first stepped structure and the second stepped structure are adapted to mate with each other to limit movement of the line laser emitter in an axial direction, which is conducive to improving the assembly efficiency.

In some embodiments of the present disclosure, the line laser emitter 110 may include a line laser emitter and a laser drive circuit, wherein the line laser drive circuit may receive a drive signal and drive the line laser emitter to emit a line laser based on the drive signal.

Further, the laser drive circuit may include an amplifying circuit by which the drive signal may be amplified and the amplified drive signal may be sent to the line laser emitter, thereby causing the line laser emitter to emit light. In some embodiments of the present disclosure, the drive signal may include a control signal and an adjustment signal. The line laser emitter may be controlled to turn on or off by the control signal, and the emission power of the line laser emitter may be adjusted by the adjustment signal. In some embodiments, the amplifying circuit may include a first amplifying circuit and a second amplifying circuit.

Here, the first amplifying circuit is configured to receive a control signal from the master control unit and send the control signal to the line laser emitter after amplification, so as to control the line laser emitter to turn on or off.

The second amplifying circuit is configured to receive the adjustment signal from the master control unit and send the adjustment signal to the line laser emitter after amplification, so as to control the emission power of the line laser emitter.

The specific structures of the first amplifying circuit and the second amplifying circuit are not specifically limited here, as long as they can achieve the signal amplification function.

In some embodiments provided by the present disclosure, the line laser module includes a main part and a first environmental image acquisition assembly. The first environmental image acquisition assembly includes a camera disposed on the main part, at least a pair of line laser emitters and a first environmental image processing module. The pair of line laser emitters is disposed on respective sides of the camera and is configured to emit a line laser with a linear projection. The camera and the line laser emitting device work with each other and are used to acquire the first environmental image. The first environmental image processing module can acquire the obstacle position information based on the first environmental image.

In some embodiments, the first environmental image captured by the camera is configured to measure the distance from the obstacle when the line laser emitter is on. The second environmental image captured by the camera is configured to identify the type of the obstacle when the line laser emitter is off and the infrared flashlight is on. Thus, the type of the obstacle can be identified according to the second environmental image captured by the camera 120. Then, it can be determined whether the device body 200 needs to perform the obstacle avoidance operation according to the type of the obstacle. Thus, when the device body 200 needs to perform the obstacle avoidance operation, the distance from the obstacle is determined for the corresponding obstacle avoidance operation by the camera 120 and the line laser emitter 110 cooperating with each other. When the device body 200 does not need to perform the obstacle avoidance operation, the cleaning operation can be directly performed, thus reducing the misoperation possibility of obstacle avoidance by the autonomous mobile device.

In some embodiments, the number of second environment images is in plural, such as 500, 1000, or other number that meets the requirements. For example, the number of second environment images can be determined by adjusting the exposure frequency of the camera 120. The control system performs image segmentation on the plurality of second environmental images captured by the camera 120, inputs the segmented images into a trained obstacle model, performs feature extraction on the segmented images, matches the extracted feature information with the trained obstacle model for confidence, and determines the type of obstacle according to the confidence matching result.

In other words, the line laser module provided by embodiments of the present disclosure is able to determine the type of obstacle by the second environment image acquired by the camera 120. This in turn enables the autonomous mobile device to determine, based on the type of obstacle, whether to perform an obstacle avoidance operation or a cleaning operation according to the original cleaning route. Besides, when the obstacle avoidance operation is required, the controller controls the camera 120 and the line laser emitter 110 to work together, and determines the distance between the obstacle and the line laser module or the distance between the obstacle and the device body 200 based on the first environment image obtained by the camera 120, so as to perform the corresponding obstacle avoidance operation.

For example, based on the second environment image captured by the camera 120, it is determined that the obstacle is a balloon. Due to the light weight of the balloon, the drive system driving the device body 200 can drive the balloon to move, meaning that the balloon does not affect the cleaning route. In this case, the controller controls the device body 200 to perform the cleaning operation in accordance with the original cleaning route, without performing the obstacle avoidance operation, rendering it possible to clean at the location of the balloon, which helps expand the cleaning range.

In another example, based on the second environmental image captured by the camera 120, it is determined that the obstacle is a chair. Because the weight of the chair is heavy, if cleaning is carried out according to the original cleaning route, the device body 200 will collide with the chair, and thus, there is a possibility of damage. In this case, the chair affects the cleaning route. So, the controller controls the device body 200 to perform the obstacle avoidance operation so as to change the cleaning route. That is, the controller controls the line laser emitter 110 to emit the line laser, and the camera 120 captures the first environmental image formed by the reflected light back from the chair. Then, the controller determines, based on the first environmental image, the distance between the line laser module and the chair or the distance between the device body 200 and the chair, and re-plans the sweeping route according to the distance for obstacle avoidance, which improves the obstacle avoidance effect.

In some embodiments provided by the present disclosure, the camera 120 is a black and white camera with an infrared lens provided in front of the black and white camera, allowing only infrared light to pass through. It should be understood that the line laser emitter 110 cooperating with the camera 120 is an infrared laser tube, which emits an infrared laser.

Further, the fixed base 140 includes a body 141 and end portions 142 located on respective sides of the body 141, wherein the camera 120 is assembled on the body 141 and the line laser emitter 110 is assembled on the end portions 142. The line laser emitter is movably connected the end portions 142, and is able to rotate and swing with respect to the end portions 142. Thus, the rotation angle and the orientation angle of the line laser emitter can be adjustable.

In some embodiments of the present disclosure, the line laser module further includes a second environmental image processing module, wherein the second environmental image processing module may include a feature extraction module and an identification module.

Here, the feature extraction module is configured to extract features from the second environmental image to obtain feature information.

For example, gray scale information and position information of pixels satisfying certain conditions in the second environmental image may be taken as feature information. In some embodiments, the feature extraction module can be configured to pre-process the second environment image, e.g., to binarize the second environment image. Then, the gray scale information and the position information of each pixel in the pre-processed second environment image are obtained. After that, a predetermined gray scale range is compared with the gray scale information of each pixel, and the gray scale information within the gray scale range and the corresponding position information of the pixel are derived as the feature information.

Apparently, feature information can be extracted in the second environment image by other means, which are not specially limited here.

The identification module is configured to input the feature information into a pre-trained obstacle identification model to identify the obstacle type information.

The obstacle identification model can be obtained by pre-training samples of obstacle images, which can be a neural network model, a classifier or other models that can be used to determine whether there is an obstacle in the second environment image based on the feature information. The training method of the obstacle identification model and the specific working process of determining whether an obstacle exists or not, are not specially limited herein. The obstacles mentioned in the present disclosure can be paper scraps, books, table legs, doors, refrigerators, curtains, etc. which are not listed here.

The identification module may input the feature information into a pre-trained obstacle classification model to identify obstacle type information when determining the presence of an obstacle in the second environment image.

Obstacle classification model can be obtained by pre-training samples for obstacle classification, which can be a neural network model, a classifier or other models that can be used to determine the type of obstacle based on the feature information. The training method of the obstacle identification model and the specific working process of determining the type of obstacle, are not specially limited here. Accordingly, the second environmental image processing module further includes a training module which is configured to generate an obstacle identification model by using the collected training data.

In the present disclosure, obstacles can be classified into three types based on the size of the obstacle, and examples are as follows.

The first type is an obstacle that can be driven over and can be cleared, such as paper scraps, etc.

The second type is an obstacle that cannot be driven over but needs to be cleared, such as a book, etc.

The third type is the obstacle that cannot be driven over and does not need to be cleaned, such as doors, walls, table legs, etc.

In some embodiments provided by the present disclosure, the autonomous mobile device may further include a charging station, the charging station being adapted to be in a detachable connection with the device body 200. For example, the device body 200 is docked with the charging station for charging when the device body 200 needs to be charged. The device body 200 is separated from the charging station for cleaning when the device body 200 performs cleaning operations. The charging station includes an infrared emitting device for emitting an infrared signal, such as a near-field infrared signal. The line laser module further includes a return positioning device 190. It should be understood that the return positioning device 190 is provided in the fixed base 140, and configured to receive the infrared signal emitted by the charging station.

In some embodiments with the return positioning device 190 provided in the fixed base 140, when the line laser module is installed on the device body 200 and during the charging process of the device body 200, the controller controls the return positioning device 190 to search for infrared signals near the charging station. Once the return positioning device 190 receives infrared signals, it guides the device body 200 to move to dock with the charging station according to the infrared signals. Moreover, the return positioning device further includes an infrared emitting device 150 for emitting an infrared signal. When the device body 200 is successfully docked with the charging station, the controller controls the infrared emitting device 150 to emit an infrared signal to the charging station for charging the device body 200.

In some embodiments, the return positioning device 190 includes an infrared receiving device 160 and an infrared emitting device 150. The infrared receiving device 160 is configured to receive infrared signals, and the infrared emitting device 150 is configured to emit infrared signals. In some embodiments, by mounting the infrared receiving device 160, the infrared emitting device 150, the camera 120, and the line laser emitter 110 on the fixed base 140, the modular design of the sensing system is achieved, which is easy to assemble and maintain.

Furthermore, the infrared receiving device 160 of the return positioning device 190 includes an infrared light, and the number of infrared receiving devices 160 is at least two. For example, the number of infrared receiving devices may be two, three, four, or other number that meets the requirements. The infrared emitting device 150 of the return positioning device 190 includes an infrared light, and the number of infrared emitting devices 150 is one, two, three, or other number that meets the requirements. In some embodiments, both the infrared receiving device 160 and the infrared emitting device 150 of the return positioning device 190 are infrared lamps, and a plurality of infrared lamps are distributed at intervals along the length direction of the fixed base 140 on the top of the fixed base 140. This guarantees the reliability of the infrared receiving device 160 in receiving near-field infrared signals and the reliability of the communication connection between the device body 200 and the charging station. It should be understood that the infrared receiving device 160 and the infrared emitting device 150 can also be set at other locations that meet the requirements, and the present disclosure will not be specifically limited.

In some embodiments provided by the present disclosure, the autonomous mobile device further includes a device control module for controlling the autonomous mobile device to move based on the obstacle position information and the obstacle type information. The device control module may be directly connected to the master control unit, and may directly obtain the obstacle position information and the obstacle type information from the master control unit after processing the first environment image and the second environment image. Alternatively, the device control module may also be connected to the master control unit through a memory, and the obstacle position information and the obstacle type information obtained by the master control unit may be stored in the memory. The device control module may directly call the obstacle position information and the obstacle type information stored in the memory.

In addition, the device control module and the main control unit can be two separate circuits or integrated in the same circuit. For example, the device control module and the main control unit can be two separate chips or integrated in the same chip. The type of the chip is not specially limited here, as long as it can realize the respective functions.

The device body 200 can also be provided with rollers, tracks and other mobile mechanism, and configured to control the mobile mechanisms to achieve autonomous mobile device movement.

In some embodiments of the present disclosure, if an obstacle is present in only one of the first environment image and the second environment image, the identification result is that there is no obstacle. For example, no obstacle location information is received, or no obstacle is determined to exist based on the obstacle type information.

If an obstacle exists in both the first environment image and the second environment image, the identification result is that an obstacle exists. At this time, the type of the obstacle may be determined according to the second environment image. For example, the obstacle position information is received, and the obstacle is determined to exist based on the obstacle type information.

For the first type of obstacles, the device control module can control the autonomous mobile device to continue moving according to the current moving path and to sweep the obstacle.

For the second and third type of obstacles, the position information of the obstacles can be derived from the obstacle position information, and the steering distance information, the steering direction information and the steering angle information of the autonomous mobile device can be determined by the device control module, so as to re-plan the moving route, that is, to plan the obstacle avoidance route. Then, the autonomous mobile device is controlled to perform automatic obstacle avoidance operation according to the obstacle avoidance route, so as to avoid the obstacles that cannot be cleared.

Furthermore, in some embodiments of the present disclosure, the autonomous mobile device may include a reminder device, which may be connected to a device control module, and the device control module may control the reminder device to emit an alert by at least one of audible and luminous means. For the second type of obstacles, not only can the obstacle be avoided by the above-mentioned way of re-planning the movement route, but also the reminder device can emit an alert tone, so as to remind the user to clean the obstacle that the autonomous mobile device cannot clear in time while avoiding the obstacle.

Figure 3:
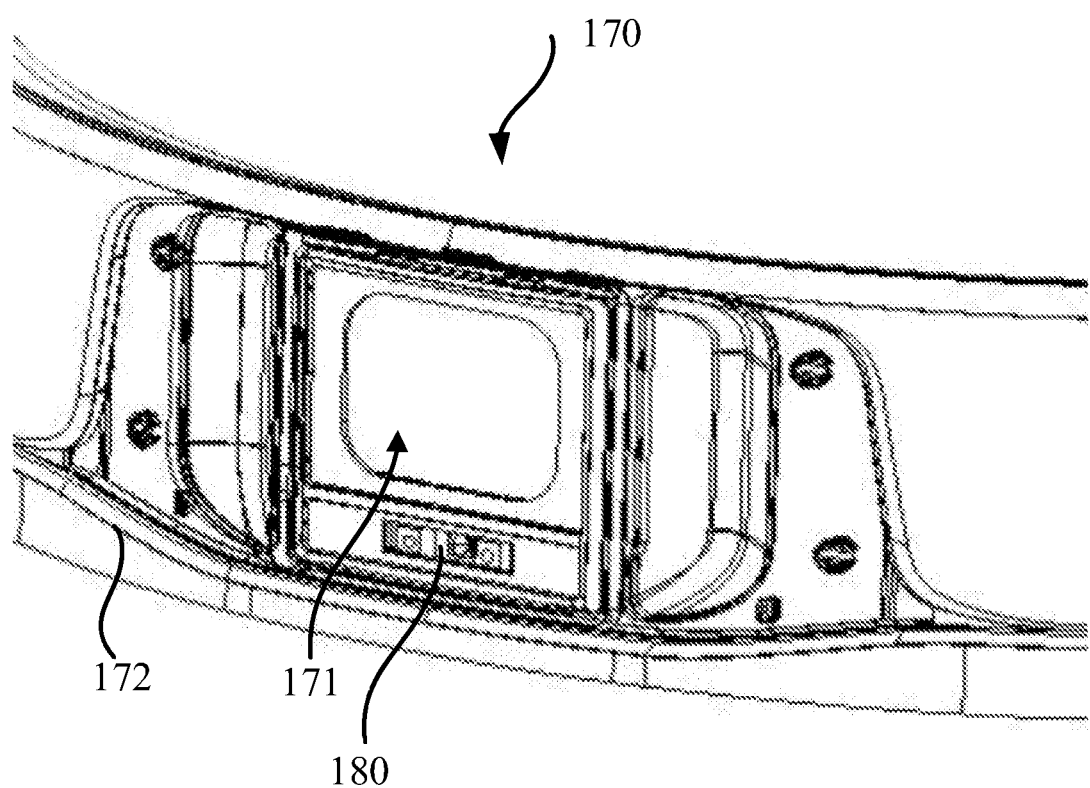
FIG. 3 is a structural schematic diagram illustrating a portion of a protective plate in some embodiments according to the present disclosure.

In some embodiments provided by the present disclosure, as shown in FIG. 3, the autonomous mobile device also includes a bumper 170, wherein the bumper 170 is arranged on the front side of the device body 200, and the line laser module is located between the bumper 170 and the device body 200. That is, the camera 120, the line laser emitter 110, and the return positioning device 190 are arranged between the bumper 170 and the device body 200. Thus, the bumper 170 plays a protective role for the camera 120, the line laser emitter 110 and the return positioning device 190, protecting them from being damaged by external forces, which is conducive to improving the service life of the camera 120, the line laser emitter 110 and the return positioning device. A window 171 is provided at a position on the bumper 170 corresponding to the camera 120, so as to enable external ambient light to enter the camera 120. A window is provided at a position on the bumper 170 corresponding to the line laser emitter 110, so as to enable the laser emitted by the line laser emitter 110 to be emitted outwardly from the bumper 170. A window is provided at a position on the bumper 170 corresponding to the return positioning device 190, so as to enable the return positioning device 190 to receive infrared signals and emit infrared signals, thereby ensuring the operation reliability of the line laser module.

It should be understood that the bumper 170 may be equivalent to a bumper rail of the device body 200. When mounting the line laser module to the autonomous mobile device, the fixed base 140 provided with the camera 120 and the line laser emitter 110 is first mounted on the device body 200, and then the bumper 170 (e.g., the bumper rail) is attached to the fixed base 140 or the device body 200.

In some embodiments provided by the present disclosure, the bumper 170 includes a bump plate 172 and an elastic member, wherein the bump plate 172 and the device body 141 are connected by an elastic member, and the line laser module is located on the inner side of the bump plate 172. The elastic member is provided to reduce the force of the bump plate 172 acting on the device body 200 and the line laser module when the bumper 170 collides with the obstacle, which plays a buffering role and further reduces the damage to the device body and the line laser module from the obstacle. A rubber cushion layer is provided on the outside of the bump plate 172, so that when the bumper 170 collides with the obstacle, the rubber cushion layer is in direct contact with the obstacle. That is, the rubber cushion layer plays a good protective role for the bump plate 172, and the rubber cushion layer is an elastic member, which can further play the role of buffering. In other words, in the present disclosure, by means of the elastic member and the rubber cushion layer, the bumper 170 has a double-layer buffering effect, which greatly reduces the possibility of damage to the device body 200 and the line laser module by obstacles and improves the reliability of the autonomous mobile device. In some embodiments, the elastic member is a resilient column and/or a spring, or can be other resilient members that meet the requirements.

In some embodiments provided by the present disclosure, the autonomous mobile device also includes an infrared flashlight 180 and an ambient light sensor. The ambient light sensor is configured to detect the brightness of the ambient light, and the infrared flashlight 180 is provided on the bumper 170 and near the window 171 corresponding to the camera 120. This enables the use of the infrared flashlight 180 to fill the light in the case where the ambient light is too weak to allow the camera 120 to clearly and accurately capture the environmental image, i.e., the current ambient light does not meet the exposure operation of the camera 120, thus meeting the shooting needs of the camera 120 and ensuring that the camera 120 can clearly and accurately capture the environmental image and improving the accuracy of the obstacle identification.

Furthermore, the controller of the autonomous mobile device is connected to the infrared flashlight 180 and the ambient light sensor, and controls the operating state of the infrared flashlight 180 according to the detection signal of the ambient light sensor, so as to fill the light for the exposure operation of the camera 120. For example, when the ambient light sensor detects that the ambient light is dark, the ambient light is insufficient to meet the requirements of the exposure operation of the camera 120, or the second environmental image captured by the camera 120 cannot accurately and clearly determine the type of obstacle in such ambient light situation, the ambient light sensor sends a signal to the controller, and the controller controls the infrared flashlight 180 according to the received signal to increase the light. Thus, the ambient light after light filing meets the shooting requirements of the camera 120, and the type of the obstacle can be accurately and quickly confirmed according to the clearer second environmental image captured by the camera 120. It should be understood that when the ambient light sensor detects that the ambient light is brighter to meet the requirements of the exposure operation of the camera 120, the ambient light sensor sends a signal to the controller, and the controller controls the infrared flashlight 180 to stop working according to the received signal, which is conducive to saving energy. In some embodiments, the controller of the autonomous mobile device can determine the intensity of the ambient light based on the brightness of the image captured by the camera, thus controlling the flashlight to turn on or off.

Furthermore, on the one hand, the ambient light sensor is arranged on the fixed base 140, on the other hand, the ambient light sensor is arranged on the bumper 170, and on the further hand, the ambient light sensors are arranged both on the fixed base 140 and the bumper 170. The different setting positions of the ambient light sensor can meet the needs of different structures of the ambient light sensor, different structures of the bumper 170, and different structures of the fixed based 140. It should be understood that providing the ambient light sensor on at least one of the fixed base 140 and the bumper 170 helps to achieve a modular design of the sensing system of the autonomous mobile device, for ease of equipping and maintenance. It should be understood that the ambient light sensor can also be provided on the device body 200.

It should be understood that the number of infrared flashlight 180 is one, two or more, and other numbers that meet the requirements. The present disclosure will not be specifically limited. In some embodiments, the infrared flashlight 180 is set below, and/or to the side, and/or above the window 171 corresponding to the camera 120, and is located on the bumper. The specific setting position of the infrared flashlight 180 is not specifically limited by the present disclosure. In some embodiments, the infrared flashlight 180 is the LED infrared flashlight 180. It can also be other infrared flashlight 180 that meets the requirements.

According to a third aspect of embodiments, the present disclosure provides an autonomous mobile device, which includes a device body, a controller, and a line laser module. The line laser module includes a camera and a line laser emitter. The line laser module is arranged on the device body. The controller is electrically connected to the camera and the line laser emitter, and configured to control the autonomous mobile device based on the environmental image captured by the camera.

In some embodiments, the autonomous mobile device further includes an infrared flashlight arranged on the bumper. The controller is connected to the infrared flashlight, and configured to control the infrared flashlight to turn on or off.

In some embodiments, the camera is configured to capture a first environmental image when the line laser emitter is on, and is configured to capture a second environmental image when the infrared flashlight is on. The first environmental image is used for obtaining a distance between a target object and the camera, and the second environmental image is used for identifying the target object.

In some embodiments, the camera is configured to capture a third environmental image when the line laser emitter and the infrared flashlight are both off. A corrected laser image is obtained based on difference between pixels at respective positions in the first environmental image and the third environmental image. A distance between the target object and the camera is determined based on the corrected laser image.

In some embodiments, the first environmental image is captured by the camera under a preset first exposure parameter, and the second environmental image is captured by the camera under a second exposure parameter, wherein the second exposure parameter is obtained based on an imaging quality and a corresponding exposure parameter of a previously-captured second environmental image. The exposure parameters include exposure time and/or exposure gain.

In some embodiments, a filter is arranged in front of the camera, and configured to allow only infrared light to enter the camera.

Figure 8:
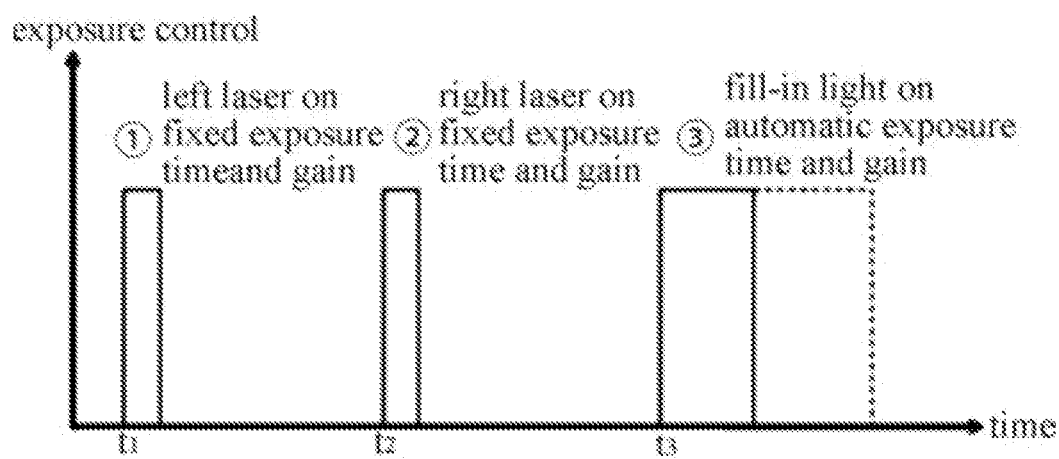
FIG. 8 is a time division control chart in time.

FIG. 8 is a time division control chart in time according to some embodiments of the present disclosure. At moment t1, the camera works with fixed exposure, and the left line laser emitter is turned on at the same time as the exposure time of the camera. At moment t2, the camera works with fixed exposure, and the right line laser emitter is turned on at the same time as the exposure time of the camera. At moment t3, the fill-in light device is turned on, the camera works with automatic exposure, and the exposure parameters are referenced to the last frame in which object identification is performed. Exposure parameters include exposure time and/or exposure gain. I.e., the first environmental image is captured by the camera under a preset first exposure parameter, and the second environmental image is captured by the camera under a second exposure parameter, wherein the second exposure parameter can be obtained based on the imaging quality of the previous frame of second environmental image combined with the exposure parameters at that time.

In some embodiments, the camera can capture the third environmental image. When the third environmental image is captured, the first predefined wavelength of laser and the second predefined wavelength of light are stopped to emit, and the target object is not irradiated by the laser or fill-in light. The third environment image is used to combine with the first environment image and the second environment image to remove background noise, thus further reducing the impact of lights, glare, etc., and ensuring that a single image is captured when all laser emitters and fill-in light devices are turned off. Besides, the purpose of capturing the third environment image is to obtain differences between the pixel points at respective positions in the first environment image and the third environment image, so as to obtain a corrected laser image for minimizing the influence of the external light source on the line laser. For example, in the case that the target object is illuminated by natural light, the natural light image is obtained to optimize the laser ranging results of the target object in the sunlight scene. Then, the distance between the target object and the camera can be determined according to the corrected laser image.

The present disclosure has been illustrated by the above-described embodiments. But it should be understood that the above-described embodiments are for the purpose of example and illustration only, and are not intended to limit the present disclosure to the scope of the described embodiments. Furthermore, it will be understood by those skilled in the art that the present disclosure is not limited to the above-described embodiments, and that a greater variety of variations and modifications may be made in accordance with the teaching of the present disclosure, all of which fall within the scope of protection claimed by the present disclosure. The scope of protection of the present invention is defined by the appended claims and their equivalent scope.

What is claimed is:

1. A line laser module, configured for use in an autonomous mobile device, and comprising:
   a fixed base, and
   a camera and a line laser emitter arranged on the fixed base, wherein
      the line laser emitter is provided with the camera, and configured to emit a laser beam with a linear projection;
      the camera is configured to operate in conjunction with the line laser emitter, and to capture an environmental image; and
      the fixed base comprises a movable element, thereby enabling an orientation angle and a rotation angle of the line laser emitter to be adjustable, wherein
         the fixed base comprises a body, end portions and a connection element, the end portions being located on respective sides of the body, the camera is arranged on the body, and the line laser emitter is inserted into the connection element, the line laser emitter is rotatably connected to the connection element to adjust the rotation angle of the line laser emitter, the connection element is movably connected to the end portions to adjust the orientation angle of the line laser emitter, and the connection element is provided with a through-hole, the line laser emitter is inserted into the connection element via the through-hole, and the line laser emitter is configured to rotate within the through-hole for adjusting the rotation angle of the line laser emitter.

2. The line laser module of claim 1, wherein
the end portion is provided with a positioning groove, and
the connection element is provided with a convex portion adapted to mate with the positioning groove and configured to be horizontally rotatable within the positioning groove, thereby making the line laser emitter to rotate relative to the end portion.

3. The line laser module of claim 1, wherein
the fixed base is provided with a mounting cavity comprising a first end and a second end opposite to the first end, wherein a cross-sectional area of the first end is smaller than a cross-sectional area of the second end;
the line laser emitter is movably arranged in the mounting cavity, and the cross-sectional area of the first end is larger than a cross-sectional area of the line laser emitter;
a front end of the line laser emitter is closer to the first end than to the second end;
the line laser emitter is rotatable relative to the mounting cavity to adjust the rotation angle of the line laser emitter; and
a rear end of the line laser emitter is configured to swing relative to the front end to adjust the orientation angle of the line laser emitter.

4. The line laser module of claim 1, wherein
the line laser emitter is in a cylindrical shape, and provided with a first stepped structure at a peripheral side of the line laser emitter;
the fixed base is provided with a mounting groove for mounting the line laser emitter, and the mounting groove is provided with a second stepped structure on an inner wall of the mounting groove; and
the first stepped structure and the second stepped structure are adapted to mate with each other to limit movement of the line laser emitter in an axial direction.

5. The line laser module of claim 1, further comprising:
a filter, arranged in front of the camera, and configured to allow only infrared light to enter the camera; and
a transceiver, configured to receive an infrared signal emitted by a charging station.

6. The line laser module of claim 5, wherein the transceiver further comprises an infrared emitting device configured to emit an infrared signal.

7. An autonomous mobile device, comprising:
a device body,
a controller, and
a line laser module, arranged in the device body, wherein
the controller is electrically connected to a camera and a line laser emitter, and configured to control the autonomous mobile device based on an environmental image captured by the camera,
the line laser module is configured for use in the autonomous mobile device, and comprises:

a fixed base, and
the camera and the line laser emitter arranged on the fixed base, wherein
the line laser emitter is provided at one or more sides of the camera, and configured to emit a laser beam with a linear projection;
the camera is configured to operate in conjunction with the line laser emitter, and to capture an environmental image; and
the fixed base comprises a movable element, thereby enabling an orientation angle and a rotation angle of the line laser emitter to be adjustable, wherein
the fixed base comprises a body, end portions and a connection element, the end portions being located on respective sides of the body,
the camera is arranged on the body, and the line laser emitter is inserted into the connection element,
the line laser emitter is rotatably connected to the connection element to adjust the rotation angle of the line laser emitter,
the connection element is movably connected to the end portions to adjust the orientation angle of the line laser emitter, and
the connection element is provided with a through-hole, the line laser emitter is inserted into the connection element via the through-hole, and the line laser emitter is configured to rotate within the through-hole for adjusting the rotation angle of the line laser emitter.

8. The autonomous mobile device of claim 7, further comprising:
a charging station, adapted to be connected with or detached from the device body, and comprising an infrared emitting device configured to emit a first infrared signal, wherein
the controller is connected to a transceiver of the line laser module, and configured to control the device body to dock with the charging station based on the first infrared signal received by the transceiver, and the controller is further configured to control an infrared light emitter to emit a second infrared signal to the charging station upon determining that the device body is successfully docked with the charging station.

9. The autonomous mobile device of claim 7, further comprising:
a bumper arranged at a front side of the device body, wherein
the line laser module is arranged between the bumper and the device body, and
the bumper is provided with windows at positions corresponding to the camera, the line laser emitter and the transceiver of the line laser module.

10. The autonomous mobile device of claim 9, further comprising:
an infrared flashlight arranged on the bumper, wherein
the controller is connected to the infrared flashlight, and configured to control the infrared flashlight to turn on or off.

11. An autonomous mobile device, comprising:
a device body,
a controller,
an infrared flashlight, wherein the controller is connected to the infrared flashlight, and configured to control the infrared flashlight to turn on or off, and
a line laser module, arranged in the device body, and comprising a camera, a fixed base and a line laser emitter, wherein the controller is electrically connected to the camera and the line laser emitter, and configured to control the autonomous mobile device based on an environmental image captured by the camera, wherein the fixed base comprises a body, end portions and a connection element, the end portions being located on respective sides of the body, the camera is arranged on the body, and the line laser emitter is inserted into the connection element, the line laser emitter is rotatably connected to the connection element to adjust a rotation angle of the line laser emitter, the connection element is movably connected to the end portions to adjust an orientation angle of the line laser emitter, and the connection element is provided with a through-hole, and the line laser emitter is inserted into the connection element via the through-hole, wherein the fixed base is provided with a mounting cavity comprising a first end and a second end opposite to the first end, a front end of the line laser emitter is closer to the first end than to the second end, and a rear end of the line laser emitter is configured to swing relative to the front end to adjust the orientation angle of the line laser emitter.

12. The autonomous mobile device of claim 11, wherein the camera is configured to capture a first environmental image when the line laser emitter is on and the infrared flashlight being off, such that a distance between a target object and the camera is determined based on the first environmental image; and the camera is configured to capture a second environmental image when the infrared flashlight is on and the line laser emitter being off, such that the target object is identified based on the second environmental image.

13. The autonomous mobile device of claim 12, wherein the camera is configured to capture a third environmental image when the line laser emitter and the infrared flashlight are both off, such that a corrected laser image is obtained based on differences between pixels of the first environmental image and respective pixels of the third environmental image, and a distance between the target object and the camera is determined based on the corrected laser image.

14. The autonomous mobile device of claim 13, wherein the first environmental image is captured by the camera under a preset first exposure parameter;

the second environmental image is captured by the camera under a second exposure parameter, wherein the second exposure parameter is determined based on an imaging quality and a corresponding exposure parameter of a previously-captured second environmental image; and each of the preset first exposure parameter, the second exposure parameter, and the corresponding exposure parameter comprises at least one of exposure time and exposure gain.

15. The autonomous mobile device of claim 11, wherein the line laser module further comprises a transceiver configured to receive an infrared signal emitted by a charging station.

16. The autonomous mobile device of claim 15, wherein the transceiver comprises an infrared emitting device configured to emit an infrared signal.

17. The autonomous mobile device of claim 11, further comprising:

a bumper arranged at a front side of the device body.

18. The autonomous mobile device of claim 17, wherein the infrared flashlight is arranged on the bumper.

19. The autonomous mobile device of claim 11, wherein a filter is arranged in front of the camera, and configured to allow only infrared light to enter the camera.

* * * * *